US007632004B2

United States Patent
Chien

(10) Patent No.: US 7,632,004 B2
(45) Date of Patent: Dec. 15, 2009

(54) LED NIGHT LIGHT WITH MORE THAN 1 OPTICS MEANS

(76) Inventor: Tseng-Lu Chien, 8F, No 29, Alley 73, Lin-Shen Road, Shi-Chi Town, Taipei Hsien (TW)

( * ) Notice: Subject to any disclaimer, the term of this patent is extended or adjusted under 35 U.S.C. 154(b) by 132 days.

(21) Appl. No.: 11/806,284

(22) Filed: May 31, 2007

(65) Prior Publication Data

US 2008/0304289 A1 Dec. 11, 2008

(51) Int. Cl.
*F21V 23/00* (2006.01)
(52) U.S. Cl. ............ 362/641; 362/642; 362/643; 362/644
(58) Field of Classification Search ......... 362/641–644, 362/800, 555, 640, 801, 802, 551, 318
See application file for complete search history.

(56) References Cited

U.S. PATENT DOCUMENTS

| 6,955,441 | B1* | 10/2005 | Chen | 362/96 |
| 2006/0007709 | A1* | 1/2006 | Yuen | 362/641 |
| 2007/0253222 | A1* | 11/2007 | Driska et al. | 362/641 |

* cited by examiner

*Primary Examiner*—Bao Q Truong
(74) *Attorney, Agent, or Firm*—Bacon & Thomas, PLLC

(57) ABSTRACT

An LED night light having more than one optics means includes a first optics elements to change a narrow-viewing angle of the LED's spot-light beams into a wider-viewing angle for area illumination, and a second optics device to help enhance the appearance and value of the LED night light without taking up excess space. Other functions and devices such as an outlet adaptor, motion sensor, PIR sensor, air freshener, second light, bug repellent, sonic repellent, time piece or any combination of such functions or features may easily be added to increase the utility of the said LED night light while reducing electric power consumption and saving money for consumers.

7 Claims, 1 Drawing Sheet

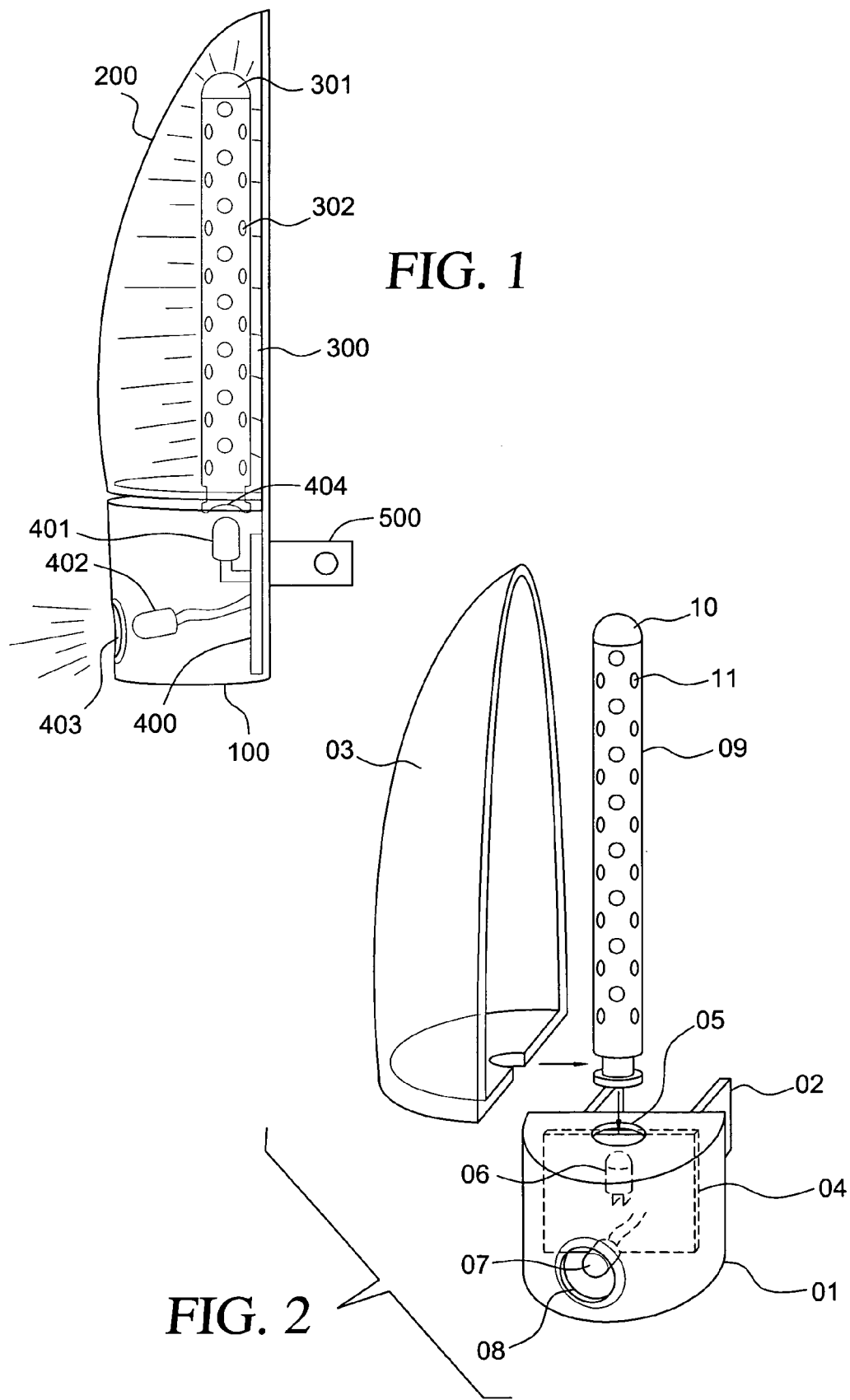

LED NIGHT LIGHT WITH MORE THAN 1 OPTICS MEANS

BACKGROUND OF THE INVENTION

This application has subject matter in common with U.S. patent application Ser. Nos. 10/883,747 (Fiber Optic light kits for footwear); 11/094,215 (LED Night light with Liquid optics medium); 11/255,981 (Multiple light source Night Light); 11/498,881 (Poly Night light); 11/527,631 (LED Night light with interchangeable display unit); 11/498,874 (Area Illumination for LED night light); 11/527,629 (Time Piece with LED night light); 11/527,628 (Multiple Function Night light with Air Freshener).

The inventor's prior art U.S. Pat. Nos. 5,926,440, 6,158, 868, 6,170,958, 6,171,117, 6,280,053 conductor arrangements for a night light, and multiple function night lights incorporated with time pieces. In addition, U.S. Pat. Nos. 4,947,291, 5,495,402, 5,662,408, 5,713,655, 5,803,579, 5,816,682, 5,833,350, 5,893,626, 5,998,928, 6,000,807, 6,010,228, 6,031,958, 6,033,087, 6,056,420, 6,132,072, 6,160,948, 6,161,910, 6,183,101, 6,190,017, 6,290,368, 6,337,946, 6,386,730, 6,390,647, 6,00,104, 6,411,524, 6,431, 719, 6,509,832, 6,523,976, 6,550,949, 6,609,812, 6,623,416, 6,641,289, 6,648,496, and 6,709,126 all show different light sources and applications. However, none of these prior patents teaches an LED night light incorporated with more than one optics means to provide pretty light effects with a nice photometric arrangement close to that of a traditional incandescent bulb's night light, accent light or floor light.

All existing LED night lights have the big problem that the LED unit has too strong brightness and yet can be seen by a viewer only along narrow viewing angle. The result is a spot-light effect (super bright over a small area). The current invention uses multiple (more than one) optics means to make a big improvement with respect to the spot-light effect by providing linear or area brightness out of the LED unit, changing the spot-light effect to a nice looking fluorescent tube like effects. It is very difficult to use only one optics means to change the strong spot-light effect of the LED unit(s) into nice and warm light effects. This is a big improvement in the LED night light. The current invention further adds some other arrangements such as reflectors), bubble(s), or lens(es) within any of the optics means to increase the effects changing the narrow viewing angle of the LED(s) into linear or area light effects.

Furthermore, the current invention solves another LED night light problem involving the size of the night light. The most popular night light currently in the marketplace has a length of around 88 mm+/−50 mm (with base), The lens height is around 60 mm+/−30 mm (without base). The height from the wall outlet cover is around 35 mm+/−15 mm (from outlet cover surface). If the LED unit is placed at the same location of the outlet cover surface, the distance from the wall to the outside of the lens will be only less than 35 mm+/−15 mm, which is too short to change the spot-light of the LED into a surface or area photometric or lighted area. This problem is solved by using two optics means to get a good surface or area lighted effect. This will be the best because the LED night light power consumption falls within the range 0.3W+/−100% per LED, whereas the power consumption of an incandescent. bulb night light falls within the range 4 Watt+/−50% per bulb. More widespread acceptance of the LED night light will result in big power savings and reductions in the monthly electricity bill for consumers.

The current invention not only provides a simple function LED night light, but the excellent light performance may be extended to night lights with other features or functions such as an outlet adaptor, motion sensor, PIR sensor, air freshener, second light, bug repellent, sonic repellent or any combination thereof, so that all LED night lights can have a nice light performance with more than a single function.

BRIEF DESCRIPTION OF THE DRAWINGS

FIG. 1 shows a first preferred embodiment of an LED night light with more than one optics means.

FIG. 2 shows details of the construction of the night light of the first preferred embodiment.

DETAILED DESCRIPTION OF THE PREFERRED EMBODIMENTS

FIG. 1 shows an LED night light with more than one optics means, including a base housing (100) which has space to arrange a circuit board (400) that converts home electricity from the prong means(500) into a signal for turning on the LED (401) and (402) for a predetermined time, period, duration, and functions. The LED units (401) (402) are at different locations for different illumination purposes. Copending U.S. patent application of Ser. No. 11/255,981, U.S. Patent Publication No. 2006/0152946 describes details of an arrangement of two light sources for a night light, and therefore details of the LED arrangement will not be discussed in further detail herein.

The first LED (401) may a have single color or multiple colors with two or more legs to connect with the circuit board (400). The LED unit with two legs normally has 1 color. The LED unit with four legs normally has three colors with three legs connected with the circuit board to get specified individual colors and one leg serving as a common leg to connect to the said circuit board and get a desired color under control of an integrated circuit (IC). The LED unit may have conductive legs or poles, or electrodes in a variety of shapes or conventional types as a chip type, regular type, surface mounting type (SMT type), or die type.

The first LED unit faces the top of the night light such that a majority of the LED's light beams are emitted to the first optics means (300). The first LED's light beam will travel within the first optics means and allow the viewer to see the light beam from everywhere. This arrangement causes the LED's spot brightness to become a tube brightness. The viewer sees a lighted tube like a fluorescent tube because this first optics means changes the LED's spot-brightness into a linear tube brightness. However, the first optics means also has its limitations. For example, the length of the optics means cannot be too long, and the diameter cannot be bigger than the LED unit's diameter. If the length of the optics means is too long, the viewer will see the brightness as very bright at the LED end and as very dim at the LED end. Hence, the length of the optics means needs to be properly selected so that the viewer will see a very nice photometric brightness. Because of these limitations, as second optics means needs to be added to provide the best light effect of the LED night light.

As shown in FIG. 1, the first optics means (300) has a proper length in order to distribute the brightness across the filed of the viewer. In order to get a more perfect light effect, the first optics means incorporates a top-tip which in a dome shape (301) that will cause all light beams that hit the dome (301) to reflect back to the first optics means (300) and cause the top-end of the first optics means to have as close a brightness as the low-end of the first optics means. Furthermore, the first optics means can have other arrangements within the first optics means to additional effects, such as by adding air-bubbles to reflect light beams that hit them in other directions. One also can add some reflective reflectors to have the same function. All equivalent skills from the conventional market will also still fall within scope of the invention.

As shown in FIG. 1, the light beams resulting from passage of the LED's (401) spot brightness through a first optics means(300) form a linear light pattern with the aid of dome tip (301) and inner air bubbles (302) to provide a super bright lighted tube. However, the length of the optics means (300) is short to avoid the problem of brightness difference between top and bottom, and the diameter is too small (if the diameter is bigger than the LED's diameter, the light only covers a certain area of the first optics means, so the diameter should be matched to the LED's diameter and distance from the LED to the base of the optics means), so the use of just one optics means cannot meet consumer requirements for a nice appearance. Therefore, a second optics means (200) in the form of a lens is added. Based on market requirements and consumer expectation, the LED night light should have an outer shape that is similar to a traditional bulb night light. Hence, the second optics means (200) preferably has a lens designed to surround the first optics means (300). The second optics means is in the form of a lens design which may have different optics arrangements on its surface or its body, such as ribs, grooves, dots, a convex lens, a concave lens, different thicknesses, reflectors, air-bubbles, liquid, miniatures, holes, windows, and/or stencils to cause the inner first optics mean's light be seen by viewer with a nice and elegant light effect.

As shown in FIG. 2, the base housing (01) has a hole (05) for installing an inner LED1 (06) and a first optic means tube (09) and cause the light beam from LED1 (06) to be emitted to the first optics means (09). The base housing (01) has a second hole (08) for an inner LED2 (08) and a hole's lens (not shown) to allow the light beam from LED2 (08) to be emitted to a desired location such as the floor through the hole's lens to provide sufficient brightness in a dark area.

As shown in FIG. 2, the circuit board (04) is fitted within the base housing (01) to allow home electricity supplied through the LED night light's prong means (02) to be delivered to the circuit board (04) to provide the right current to cause the LED 1 (06) and LED2 (07) to turn on for a predetermined time with a desired lighting effect or function, duration, and brightness. The circuit board (04) is incorporated with electric components that may include one or more resistor, capacitor, switch means, sensor means, diode, inductor, transformer, or any available components required by the electric circuit to drive the LED(s) according to the predetermined functions, duration, time, and effects. The first optics means (09) has groove rings for the second optics means (03) to clip on. The first optics means (09) has a dome top to reflect all light beams back to the first optics means as much as possible. The first optics means has a plurality of air bubbles within its body to provide a more eye-catching reflective light spot to enhance the light effect and value. The second optics means (03) is a lens design that may have different optics arrangement on it surface or its body, such as ribs, grooves, dots, a convex lens, a concave lens, different thicknesses, reflectors, air-bubbles, liquid, miniatures, holes, windows, and/or stencils to cause the inner first optics mean's light be seen by a viewer with a nice and elegant light effect Although preferred embodiments have been described in detail, it will be appreciated that any alternative or equivalent functions, arrangement, process, installation, or design may still fall within the scope of the invention, which is not limited by the above-described details.

The invention claimed is:

1. An LED night light with more than one optics means, comprising:
    at least one LED;
    at least a first optics means and a second optics means for transmitting light from said LED,
    wherein the first optics means is a linear tube having a tip arranged to cause light beams to travel back and forth within the tube, said linear tube including optical elements selected from the group consisting of reflectors, air bubbles, miniatures, and liquid,
    wherein the first and second optics means each has a predetermined shape with desired optics arrangements on their surface or within their body, the optics arrangements selected from the group consisting of ribs, grooves, dots, a convex lens, a concave lens, different thicknesses, reflectors, air-bubbles, liquid, miniatures, holes, windows, and stencils to enable light from the LED to be seen by a viewer with a nice and elegant light effect,
    wherein the first optics means changes a narrow viewing angle spotlight effect of light emitted by the LED into area illumination having a wider viewing angle, and wherein the second optics means is incorporated into the LED night light by desired attachment means, and
    wherein a circuit means is provided within the housing to include electric components selected from the group consisting of at least one resistor, capacitor, switch means, sensor means, diode, inductor, transformer, and any other electrical components that enable the electric circuit to drive the at least one LED according to predetermined functions, duration, time, and effects.

2. The LED night light with more than one optics means as recited claim 1, wherein the LED is of a type selected from the group consisting of a die type, chip type, regular type, and SMT type with single or multiple colors.

3. The LED night light with more than one optics means as recited in claim 1, wherein the LED night light has more than one LED.

4. The LED night light with more than one optics means as recited in claim 1, the said attachment means may be selected from group combination from rivet, screw, glue, sonic sealing, chemical, snap tight, catcher, or desired attachment available from marketing place.

5. The LED night light with more than one optics means as recited in claim 1, further comprising an additional device to provide at least one additional function besides a night light function.

6. The LED night light with more than one optics means as recited in claim 5, wherein the additional device is selected form the group consisting of an outlet adaptor, motion sensor, PIR sensor, air freshener, second light, bug repellent, sonic repellent and any combination of said devices.

7. The LED night light with more than one optics means as recited in claim 1, wherein the second optics means includes a lens and is arranged to surround the first optics means.

\* \* \* \* \*